US007245765B2

(12) United States Patent
Myers et al.

(10) Patent No.: US 7,245,765 B2
(45) Date of Patent: Jul. 17, 2007

(54) METHOD AND APPARATUS FOR CAPTURING PAPER-BASED INFORMATION ON A MOBILE COMPUTING DEVICE

(75) Inventors: Gregory Myers, San Francisco, CA (US); Douglas Bercow, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 133 days.

(21) Appl. No.: 10/988,110

(22) Filed: Nov. 12, 2004

(65) Prior Publication Data
US 2005/0100216 A1    May 12, 2005

Related U.S. Application Data

(60) Provisional application No. 60/519,368, filed on Nov. 11, 2003.

(51) Int. Cl.
*G06K 9/00*   (2006.01)
*G06K 9/54*   (2006.01)
*G06K 9/60*   (2006.01)

(52) U.S. Cl. ..................... 382/181; 382/305
(58) Field of Classification Search ............ 382/164, 382/173, 179, 181, 187, 188, 190, 194, 276, 382/305, 195; 715/500, 530; 716/15, 20; 345/624, 629
See application file for complete search history.

(56) References Cited

U.S. PATENT DOCUMENTS 5,303,312 A * 4/1994 Comerford et al. ......... 382/189

| 5,960,114 | A | 9/1999 | Dauerer et al. |
| 6,192,360 | B1 * | 2/2001 | Dumais et al. ............... 707/6 |
| 6,441,927 | B1 | 8/2002 | Dow et al. |
| 6,473,523 | B1 | 10/2002 | Newman et al. |
| 6,621,930 | B1 * | 9/2003 | Smadja ..................... 382/224 |
| 6,823,084 | B2 | 11/2004 | Myers et al. |
| 6,886,104 | B1 * | 4/2005 | McClurg et al. ............ 713/300 |
| 6,922,487 | B2 | 7/2005 | Dance et al. |
| 6,947,609 | B2 | 9/2005 | Seeger et al. |
| 7,031,553 | B2 | 4/2006 | Myers et al. |
| 7,039,856 | B2 * | 5/2006 | Peairs et al. ................ 715/500 |
| 7,050,629 | B2 * | 5/2006 | Jackson et al. ............ 382/173 |

(Continued)

OTHER PUBLICATIONS

Y. Watanabe, Y. Okada, Y. Kim, T. Takeda, "Translation Camera," 14th International Conference on Pattern Recognition (ICPR'98)—vol. 1, 1998, pp. 613-617.
International Search Report for PCT/US04/37863; mailing date Aug. 28, 2006; copy consists of 4 unnumbered pages.

*Primary Examiner*—Yon J. Couso
(74) *Attorney, Agent, or Firm*—Kin-Wah Tong, Esq.; Patterson & Sheridan, LLP

(57) ABSTRACT

A method and apparatus are provided for capturing paper-based information on a mobile computing device. In one embodiment, the inventive method includes capturing a digital image of the paper-based information, where the digital image comprises text (and in some cases non-text) components of the paper-based information. At least a portion of the paper-based information is then categorized based on the content of the text components and stored accordingly in either a local or remote database.

29 Claims, 3 Drawing Sheets

U.S. PATENT DOCUMENTS

| | | |
|---|---|---|
| 2002/0037104 A1 * | 3/2002 | Myers et al. ............... 382/187 |
| 2002/0051575 A1 | 5/2002 | Myers et al. |
| 2002/0180726 A1 | 12/2002 | Shi et al. |
| 2003/0169923 A1 | 9/2003 | Butterworth |
| 2003/0223638 A1 | 12/2003 | Jackson et al. |
| 2005/0100216 A1 | 5/2005 | Myers et al. |
| 2005/0123200 A1 | 6/2005 | Myers et al. |
| 2005/0259866 A1 | 11/2005 | Jacobs et al. |
| 2006/0029296 A1 | 2/2006 | King et al. |
| 2006/0050996 A1 | 3/2006 | King et al. |

* cited by examiner

METHOD AND APPARATUS FOR CAPTURING PAPER-BASED INFORMATION ON A MOBILE COMPUTING DEVICE

CROSS REFERENCE TO RELATED APPLICATIONS

This application claims the benefit of U.S. Provisional Patent Application Ser. No. 60/519,368, filed Nov. 11, 2003 (titled "Method and Apparatus for Reading and Storing Contact Information"), which is herein incorporated by reference in its entirety.

FIELD OF THE INVENTION

The present invention relates generally to image processing and relates more specifically to the capture and storage of paper-based information by a mobile computing device.

BACKGROUND OF THE DISCLOSURE

The storage of information such as contact information in a digital format offers several advantages (e.g., ease of searching, synchronization between multiple digital devices) over paper-based storage. However, in many cases, the information to be stored is distributed in a paper-based format. For example, paper business cards are still the predominant means of distributing contact information. Manual entry of such paper-based information into a computing device is time-consuming, especially as the volume of information conveyed on business cards (e.g., multiple phone numbers or email addresses, multiple languages) increases.

Existing methods for digitally exchanging traditionally paper-based information, such as business card information, typically require both the sender and receiver devices to support specific file formats and communication protocols. Moreover, such methods typically exchange solely ASCII text strings, and are not capable of capturing critical non-text information, such as the design or presentation of the information to be captured. This information may be selected by a corporation or an individual in order to convey a desired image, e.g., as embodied in a corporate logo. Other methods involve using purpose-built devices (e.g., comprising scanners and character recognition software) that connect to a computing device but are not portable and thus do not allow a user to immediately update previously stored information.

Thus, there is a need in the art for a method and apparatus for capturing paper-based information on a mobile computing device.

SUMMARY OF THE INVENTION

A method and apparatus are provided for capturing paper-based information on a mobile computing device. In one embodiment, the inventive method includes capturing a digital image of the paper-based information, where the digital image comprises text (and in some cases non-text) components of the paper-based information. At least a portion of the paper-based information is then categorized based on the content of the text components and stored accordingly in either a local or remote database.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for capturing paper-based information, such as contact information from a paper business card, in a digital format on a mobile computing device (e.g., a cellular phone, a digital camera, a personal digital assistant or any other portable device in which image capture and processing capabilities can be incorporated). In one embodiment, a novel method is disclosed that enables real-time digital capture, storage and categorization of paper-based information on a mobile computing device without connections to additional external hardware. Moreover, the novel method allows for the capture and storage of non-text components of the paper-based information as well as the text components, including corporate logos and stylized typefaces.

Figure 1:
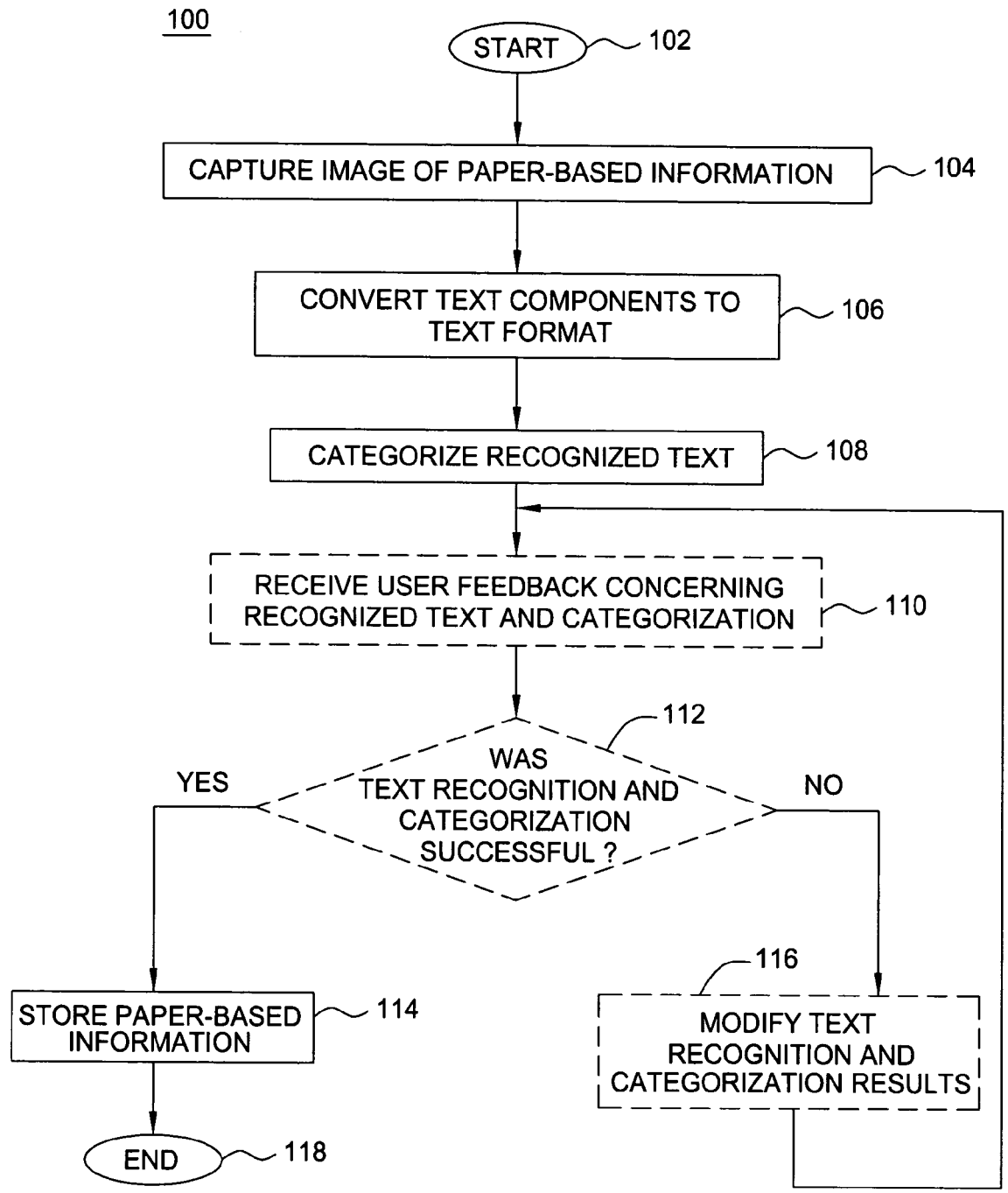
FIG. 1 is a flow diagram illustrating one embodiment of a method for capturing and storing paper-based information in a database of a mobile computing device according to the present invention.

FIG. 1 is a flow diagram illustrating one embodiment of a method 100 for capturing and storing paper-based information in a database of a mobile computing device according to the present invention. As used herein, the term "paper-based information" means the information presented in any hard—(e.g., non-digital) format, such as information found on paper business cards, mail pieces, checks, advertisements, books, napkins, stationery, whiteboards and the like. In one embodiment, the database in which the captured information is stored may be a local database (e.g., residing at the same device as the capturing mechanism) or a remote database (e.g., residing at a different device than the capturing mechanism).

The method 100 is initialized at step 102 and proceeds to step 104, where the method 100 captures an image of paper-based information. In one embodiment, the image of the paper-based information comprises both text and non-text components (e.g., logos or designs) present in the paper-based information. In one embodiment, the image is captured in a high-resolution image format having resolution that allows accurate recognition of characters in the image even after the image is compressed. In one embodiment, the image is captured in Tag Image File Format (TIFF) or Joint Photographic Experts Group (JPEG) format.

In step 106, at least some of the text components in the captured image of the paper-based information are converted to text format by a recognition process, to create recognized text. In one embodiment, known optical character recognition (OCR) techniques are applied to recognize portions of the captured image of the paper-based information. In another embodiment, specialized techniques are applied to locate text within the captured image of the paper-based information and to separate the text from the background. For example, in step 106 the method 100 may apply character recognition techniques such as those described in co-pending, commonly assigned U.S. patent application Ser. No. 09/895,868, filed Jun. 29, 2001, the teachings of which are herein incorporated by reference.

In another embodiment, character recognition in accordance with step 106 further involves disambiguation. In this embodiment, recognized text is compared to an information source (e.g., including one or more databases of addresses, zip codes, phone numbers, existing contact information, corporate logos, and the like), and the recognition process is refined or constrained to produce results that are meaningful with respect to the information source. For example, if the recognized text includes an address, information such as the street address and the ZIP+4 code may be compared to ensure that a meaningful or accurate recognition has been performed. That is, if the street address is recognized to be X, and the ZIP+4 code is recognized to be Y, the method 100 may confirm the recognition results with a greater degree of certainty by verifying that street address X exists within ZIP+4 code Y. If a meaningful recognition has not been performed, the recognition process may be repeated using data from the information source. Alternatively, data from the information source may be integrated in a first recognition attempt. Address recognition techniques suitable for use in conjunction with step 106 include techniques disclosed in co-pending, commonly assigned U.S. patent application Ser. No. 09/967,228, filed Sep. 28, 2001, the teachings of which are herein incorporated by reference.

By way of further example, recognition of non-text components of the image of the paper-based information, comprising a corporate name or logo presented in a stylized typeface, could be performed by comparing a recognized street address to names of known corporations (e.g., using an information source including a telephone directory and/or register of corporations). Alternatively, an image of the stylized presentation of a corporate name or a corporate logo could be compared to an information source containing corporate logos (e.g., trademark records) using image matching techniques known in the art. In one embodiment, the method 100 may apply image matching techniques in accordance with the techniques taught by co-pending, commonly assigned U.S. patent application Ser. No. 10/925,335, filed Aug. 24, 2004, the teachings of which are herein incorporated by reference.

In another example, recognized text representing a uniform resource locator (URL) can be verified substantially automatically by confirming the URL's existence, e.g., through a web browser. Additional recognized text representing a corporate address, employee name and the like can also be verified by searching for the items on the corporate web site.

In step 108, the method 100 categorizes the recognized text according to the content of the recognized text (e.g., what the recognized text represents, such as a name, a phone number, an address, etc.). That is, the method 100 uses the content of the recognized text to place or classify the recognized text within some sort of context for use. In one embodiment, categorization in accordance with step 108 also involves language translation, wherein the recognized text is translated from a first language into a different second language before the text is processed further. Language translation advantageously allows a user to maintain a database of captured information in a single language, so that the information is easily searchable even though it may be received or captured in several different languages. In such an embodiment, a multilingual OCR technique may be implemented in step 106, or a language identification step (e.g., automatic or manually set) may precede one or more single-language OCR implementations.

In an alternative embodiment, recognition and categorization of the captured paper-based information (e.g., in accordance with steps 106-108) are accomplished by transmitting the captured image of the paper-based information to a remote server that is in communication with the mobile computing device (e.g., over a public telephone network, cellular telephone network or the Internet). The server processes the transmitted image of the paper-based information and returns one or more identified text components contained within the transmitted image of the paper-based information. In one embodiment, the identified text components contained within the image of the paper-based information are categorized by the server prior to returning the results to the user. Those skilled in the art will appreciate, however, that other combinations of local- and server-based methods may be implemented to capture, process and store paper-based information in digital format for display on a mobile computing device in accordance with the present invention. For example, recognition may be performed locally, and the recognized text, rather than the original image of the paper-based information containing the text, may be sent to the server. Considerations such as the processing and memory capabilities of the user device, the cost of data transmissions to the remote server, and concerns of data privacy will be readily appreciated to influence the distribution of local and remote tasks.

In one embodiment, once recognized text is categorized, the method 100 proceeds to optional step 110 (illustrated in phantom) and receives feedback from a user either confirming that the recognition and characterization of the text (e.g., in steps 106 and 108) are accurate or indicating that corrections are necessary. In one embodiment, the text recognition and characterization results are presented visually to the user (in some embodiments along with the original captured image of the paper-based information), and the feedback is received in the form of audible input (e.g., voice confirmation) or manual input (e.g., from a physical interface located on the mobile computing device, such as a stylus or key press interface).

In one embodiment, the user feedback further includes feedback related to conflicts between the categorized text information and information already stored in the user's database. For example, the categorized text information may be matched against the current contents of the user's database, and if a matching entry within the database is located, the method 100 may query the user as to whether the categorized text information should replace or augment the existing entry, or create a new entry. In one embodiment, matching the categorized text information against existing database entries is performed using "fuzzy" matching techniques such as those described in U.S. Pat. No. 1,261,167 to Russell, issued Apr. 2, 1918.

In step 112, the method 100 determines, based on the user input, whether the text recognition and categorization was successful or accurate. If the method 100 determines in step 112 that the recognized and categorized text information is not accurate, the method 100 proceeds to step 116 and modifies the text recognition and categorization results. In one embodiment, text recognition and categorization modification in accordance with step 116 involves asking the user to correct the results (e.g., manually or verbally). In another embodiment, the method 100 attempts to re-recognize and categorize the text in the captured image of the paper-based information (e.g., in accordance with steps 106-108 as described above). Once the text recognition and categorization results have been modified, the method 100 returns to step 110 and again receives user feedback, this time regarding the modified text recognition and categorization results.

Alternatively, if the method 100 determines in step 112 that the recognized and categorized text information is accurate, the method 100 proceeds to step 114 and stores at least a portion of the recognized and categorized text contained within the image of the paper-based information in the user's database. In some embodiments, images representing non-text components of the paper-based information are also stored in the user's database. In embodiments where the database is stored on a remote device (e.g., not the device that captured and/or processed the image of the paper-based text information), storage in accordance with step 112 involves transmitting the text information, e.g., over a communications network, to the database for update or entry. The method 100 then terminates in step 118.

The method 100 thereby enables real-time digital capture, storage and categorization of paper-based information, such as contact information from a paper business card, on a truly mobile computing device. Connections to non-mobile external hardware are not required for real-time capture, storage and categorization. Moreover, the method 100 allows for the capture and storage of non-text components of the paper-based information as well, including corporate logos and stylized typefaces.

Figure 2:
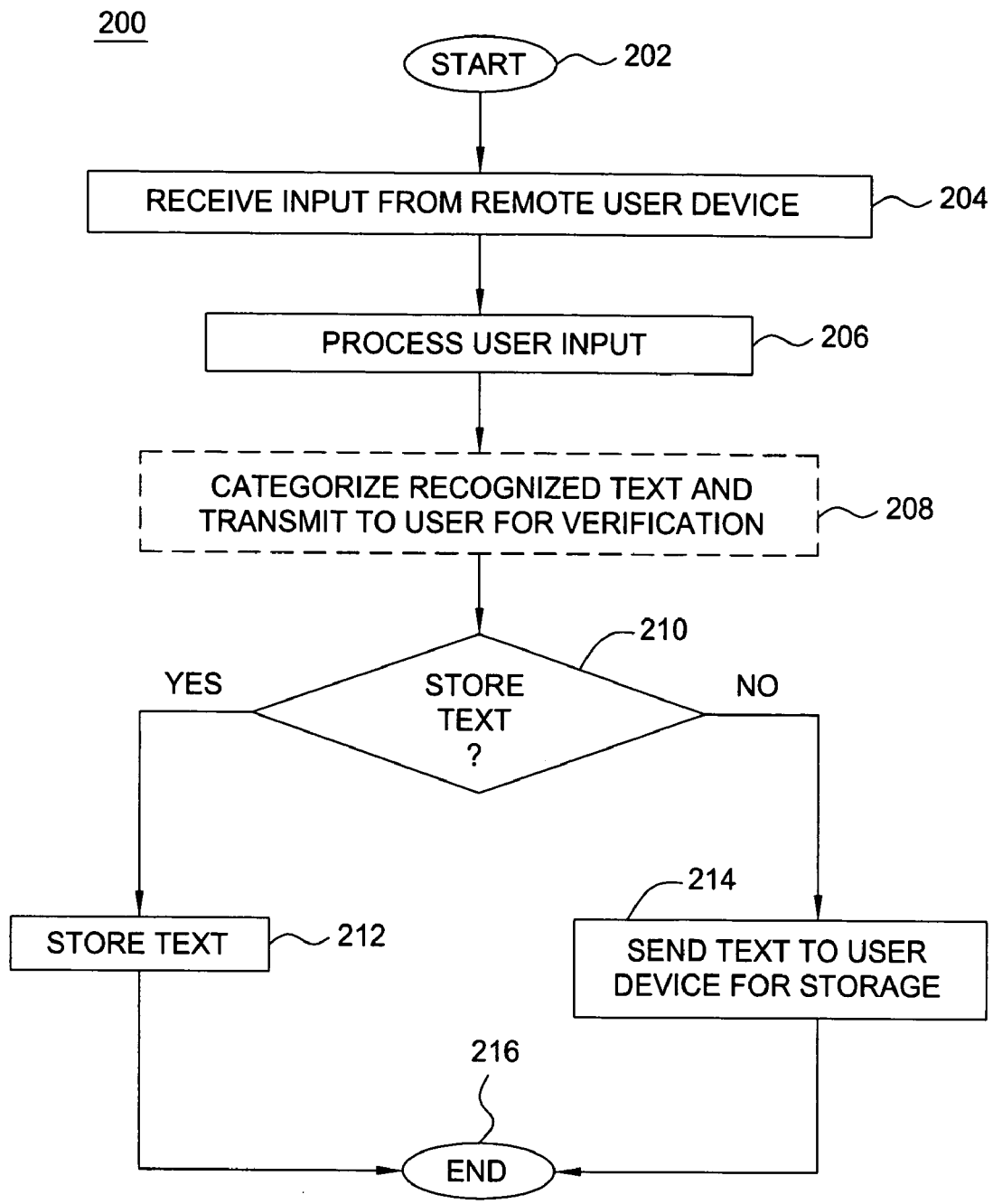
FIG. 2 is a flow diagram illustrating one embodiment of a server-side method for processing and/or storing paper-based information, according to the present invention.

FIG. 2 is a flow diagram illustrating one embodiment of a server-side method 200 for processing and/or storing paper-based information, according to the present invention. The method 200 is initialized at step 202 and proceeds to step 204, where the method 200 receives input from a remote user device in communication with the server. In one embodiment, the received input is a digital image of paper-based information containing text. In another embodiment, the input comprises one or more text components derived from an image of paper-based information that was previously captured and processed by the remote user device.

In step 206, the method 200 processes the user input. In one embodiment, where the input is a digital image of paper-based information containing text (and possibly non-text) components, the method 200 processes the image to recognize at least some of the text contained therein. In another embodiment, where the input comprises one or more text components derived from a previously processed digital image of paper-based information, the method 200 further processes the text components to facilitate categorization (e.g., by comparing the recognized text to one or more information sources in order to refine the results). This second embodiment advantageously reduces the size of the transmission received from the user in step 204.

In one embodiment, the method 200 then proceeds to optional step 208, where the method 200 categorizes the recognized text (e.g., as described above) and transmits the recognized and categorized text to the user for verification.

In step 210, the method 200 inquires if the processed (e.g., recognized and categorized) text information should be stored at the server. If the method 200 determines that the text information should be stored at the server, the method 200 proceeds to step 212 and stores the text information at the server. Alternatively, if the method 200 determines that the text information should not be stored at the server, the method 200 proceeds to 214 and sends the text information back to the user device for local storage. The method 200 then terminates at step 216.

Figure 3:
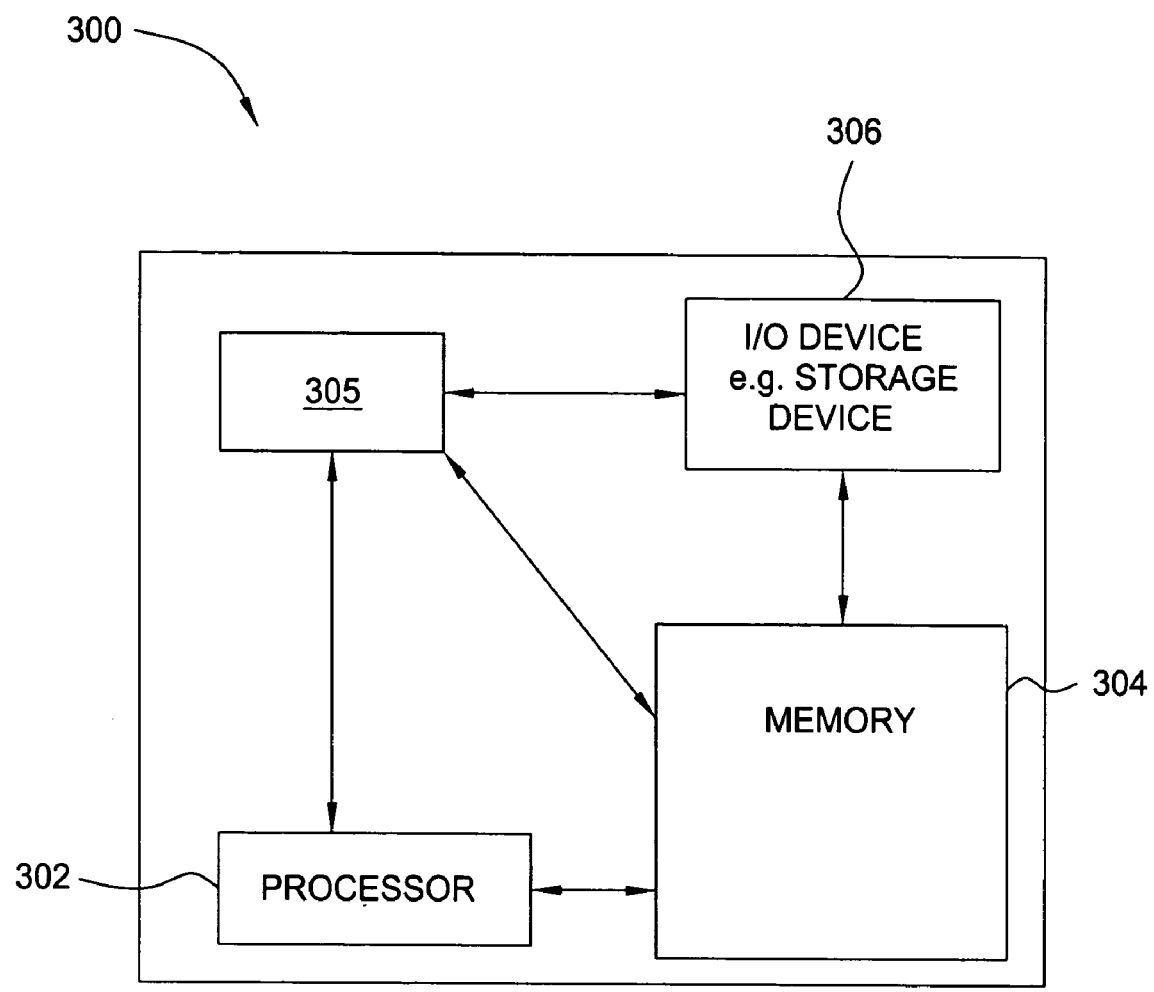
FIG. 3 is a high level block diagram of the present method for capturing and storing paper-based information on mobile computing device that is implemented using a general purpose computing device.

FIG. 3 is a high level block diagram of the present method for capturing paper-based information on a mobile computing device that is implemented using a general purpose computing device 300. In one embodiment, a general purpose computing device 300 comprises a processor 302, a memory 304, a data capture and analysis module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the data capture and analysis module 305 can be implemented as a physical device or subsystem that is coupled to a processor through a communication channel. In one embodiment, the data capture and analysis module 305 includes an imaging sensor.

Alternatively, the data capture and analysis module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the data capture and analysis module 305 for capturing paper-based information on a mobile computing device described herein with reference to the preceding Figures can be stored on a computer readable medium or carrier (e.g., RAM, magnetic or optical drive or diskette, and the like).

Thus, the present invention represents a significant advancement in the field of image processing. In one embodiment, a novel method is disclosed that enables real-time digital capture, storage and categorization of paper-based information on a mobile computing device without connections additional external hardware. Moreover, the novel method allows for the capture and storage of non-text components of the paper-based information as well as the text components, including corporate logos and stylized typefaces.

Although various embodiments which incorporate the teachings of the present invention have been shown and described in detail herein, those skilled in the art can readily devise many other varied embodiments that still incorporate these teachings.

What is claimed is:

1. A method for storing paper-based information on a mobile computing device, the method comprising:

capturing a digital image of said paper-based information, where said paper-based information comprises text components;

processing said digital image of said paper-based information to recognize at least some of said text components;

verifying an accuracy of said recognized text components;

categorizing at least a portion of said paper-based information based on content of said recognized text components; and storing said at least a portion of said paper-based information.

2. The method of claim 1, wherein said capturing, processing, verifying, categorizing and storing are all performed on said mobile computing device.

3. The method of claim 1, wherein at least one of said capturing, processing, verifying, categorizing and storing is performed locally at said mobile computing device and at least one of said capturing, indexing and storing is performed at a remote server in communication with said mobile computing device.

4. The method of claim 1, wherein said verifying comprises:
comparing said recognized text components to an information source in order to refine said recognized text components.

5. The method of claim 4, wherein said information source is obtained from a remote server.

6. The method of claim 1, wherein said categorizing further comprises:
translating said recognized text components from a first language into a second language.

7. The method of claim 1, wherein said verifying comprises:
receiving user input indicating an accuracy of said recognized text components.

8. The method of claim 7, wherein said user input includes a correction to said recognized text components.

9. The method of claim 7, wherein said user input is a verbal signal.

10. The method of claim 7, wherein said user input is received from a physical interface located on said mobile computing device.

11. The method of claim 7, wherein the user input further indicates whether the paper-based information contained in said digital image should replace or augment information already stored.

12. The method of claim 1, wherein said storing comprises: storing said at least a portion of said paper-based information in a local database.

13. The method of claim 1, wherein said storing comprises:
transmitting said at least a portion of said paper-based information to a remote database for storage.

14. A computer readable medium containing an executable program for storing paper-based information on a mobile computing device, where the program performs the steps of:
capturing a digital image of said paper-based information, where said paper-based information comprises text components;
processing said digital image of said paper-based information to recognize at feast some of said text components:
verifying an accuracy of said recognized text components;
categorizing at least a portion of said paper-based information based on content of said recognized text components; and
storing said at least a portion of said paper-based information.

15. The computer readable medium of claim 14, wherein said capturing, processing, verifying, categorizing and storing are all performed on said mobile computing device.

16. The computer readable medium of claim 14, wherein at least one of said capturing, processing, verifying, categorizing and storing is performed locally at said mobile computing device and at least one of said capturing, indexing and categorizing is performed at a remote server in communication with said mobile computing device.

17. The computer readable medium of claim 14, wherein said verifying comprises:
comparing said recognized text components to an information source in order to refine said recognized text components.

18. The computer readable medium of claim 14, wherein said categorizing comprises:
translating said recognized text components from a first language into a second language.

19. The computer readable medium of claim 14, wherein said information source is obtained from a remote server.

20. The computer readable medium of claim 14, wherein said verifying comprises:
receiving user input indicating an accuracy of said recognized text components.

21. The computer readable medium of claim 20, wherein said user input includes a correction to said recognized text components.

22. The computer readable medium of claim 20, wherein said user input is a verbal signal.

23. The computer readable medium of claim 20, wherein said user input is received from a physical interface located on said mobile computing device.

24. The computer readable medium of claim 20, wherein the user input further indicates whether the paper-based information contained in said digital image should replace or augment information already stored.

25. The computer readable medium of claim 14, wherein said storing comprises:
storing said at least a portion of said paper-based information in a local database.

26. The computer readable medium of claim 14, wherein said storing comprises:
transmitting said at least a portion of said paper-based information to a remote database for storage.

27. Apparatus for storing paper-based information on a mobile computing device, the apparatus comprising:
means for capturing a digital image of said paper-based information, where said paper-based information comprises text components;
means for processing said digital image of said paper-based information to recognize at least some of said text components;
means for verifying an accuracy of said recognized text components
means for categorizing at least a portion of said paper-based information based on content of said recognized text components; and
means for storing said at least a portion of said paper-based information.

28. A method for storing paper-based information on a mobile computing device, the method comprising:
capturing a digital image of said paper-based information, where said paper-based information comprises text components;
categorizing at least a portion of said paper-based information based on content of said text components, where said categorizing comprises:
processing said digital image of said paper-based information to recognize at least some of said text components; and
indexing said at least a portion of said paper-based information based on
said recognized text components;
receiving user input indicating an accuracy of said recognized text components; and
storing said at least a portion of said paper-based information.

29. A computer readable medium containing an executable program for storing paper-based information on a mobile computing device, where the program performs the steps of:

capturing a digital image of said paper-based information, where said paper-based information comprises text components;

categorizing at least a portion of said paper-based information based on content of said text components, where said categorizing comprises:

processing said digital image of said paper-based information to recognize at least some of said text components; and indexing said at least a portion of said paper-based information based on said recognized text components;

receiving user input indicating an accuracy of said recognized text components; and storing said at least a portion of said paper-based information.

* * * * *